(12) United States Patent
Chintakunta

(10) Patent No.: US 12,086,164 B2
(45) Date of Patent: Sep. 10, 2024

(54) EXPLAINABLE LAYERED CONTEXTUAL COLLECTIVE OUTLIER IDENTIFICATION IN A HETEROGENEOUS SYSTEM

(71) Applicant: Kyndryl, Inc., New York, NY (US)

(72) Inventor: Mouleswara Reddy Chintakunta, Allagadda (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/867,996

(22) Filed: Jul. 19, 2022

(65) Prior Publication Data
US 2024/0028616 A1    Jan. 25, 2024

(51) Int. Cl.
*G06F 16/28*    (2019.01)
*G06F 16/178*    (2019.01)
*G06F 16/25*    (2019.01)

(52) U.S. Cl.
CPC ........ *G06F 16/285* (2019.01); *G06F 16/1794* (2019.01); *G06F 16/258* (2019.01)

(58) Field of Classification Search
CPC ... G06F 16/285; G06F 16/258; G06F 16/1794
See application file for complete search history.

(56) References Cited

U.S. PATENT DOCUMENTS

| 2007/0289013 A1 | 12/2007 | Lim |
| 2015/0269050 A1 | 9/2015 | Filimonov et al. |
| 2016/0048552 A1* | 2/2016 | Graham ............... G06F 16/215 707/690 |
| 2017/0279829 A1* | 9/2017 | Vasseur ............... H04L 63/1458 |
| 2018/0100784 A1 | 4/2018 | Patil et al. |
| 2018/0232426 A1* | 8/2018 | Gomez ................ G06F 16/258 |
| 2021/0037031 A1 | 2/2021 | Kulkarni et al. |
| 2021/0049503 A1* | 2/2021 | Nourian ............. G06F 11/3466 |
| 2022/0101069 A1* | 3/2022 | Jia ........................... G06F 17/18 |
| 2022/0321579 A1* | 10/2022 | Huang ................... H04L 41/16 |
| 2022/0365912 A1* | 11/2022 | Klein ....................... G06N 5/04 |

FOREIGN PATENT DOCUMENTS

CN    109993198 A    7/2019

OTHER PUBLICATIONS

Kien Do et al., "Outlier Detection on Mixed-Type Data: An Energy-based Approach", arXiv:1608.04830v1 [stat.ML], Aug. 17, 2016, 15 pages.
Liang-Chieh Chen et al., "Prediction-Based Outlier Detection with Explanations", IEEE International Conference on Granular Computing; DOI: 10.1109/GrC.2012.6468672, Feb. 25, 2013, 6 pages.

* cited by examiner

*Primary Examiner* — Kris E Mackes
*Assistant Examiner* — Lin Lin M Htay
(74) *Attorney, Agent, or Firm* — CANTOR COLBURN LLP; Erik Swanson

(57) ABSTRACT

Embodiments of the present invention provide an approach for identifying outliers (e.g., detecting the outliers and generating outlier explainability) in a heterogeneous system. Heterogeneous input data is received from any number of data sources having any number of data types and converted into a single predefined format. Global outliers are detected in a first pass of the data. Contextual outliers are detected in a second pass. Global and contextual outliers are then collectively grouped based on outlier type. Output data is then generated including explainability for each detected outlier.

20 Claims, 8 Drawing Sheets

EXPLAINABLE LAYERED CONTEXTUAL COLLECTIVE OUTLIER IDENTIFICATION IN A HETEROGENEOUS SYSTEM

TECHNICAL FIELD

The present invention relates to data management, and more specifically to embodiments for identifying outliers (e.g., detecting the outliers and generating outlier explainability in a heterogeneous system).

BACKGROUND

Rapidly developing areas of information technology are generating massive amounts of data. Human errors, sensor failures, and other unforeseen circumstances can tend to undermine the quality and consistency of these datasets by introducing outliers (or anomalies)—data points that exhibit surprising behavior when compared to the rest of the data. Characterizing, locating, and in some cases eliminating these outliers can offer insight about the data under scrutiny and reinforce the confidence that one might have in conclusions drawn from otherwise noisy datasets.

SUMMARY

Embodiments of the present invention provide an approach for identifying outliers (e.g., detecting the outliers and generating outlier explainability) in a heterogeneous system. Heterogeneous input data is received from any number of data sources having any number of data types and converted into a single predefined format. Global outliers are detected in a first pass of the data. Contextual outliers are detected in a second pass. Global and contextual outliers are then collectively grouped based on outlier type. Output data is then generated including explainability for each detected outlier. Explainability (also referred to as "interpretability") is the concept that a machine learning model and its output can be explained in a way that "makes sense" to a human being at an acceptable level. It aims to answer user questions about the decision-making process of outlier identification. In other words, it provides an explanation or reason as to why a particular data point was classified as an outlier.

A first aspect of the present invention provides a method for identifying outliers in a heterogeneous system, the method comprising: receiving, by a processor of a computing system, a number of data points as input having a plurality of data types; formatting, by the processor, the received data points into a predefined format; detecting, by the processor, a number of outliers regardless of outlier type within the formatted data; collectively grouping, by the processor, each outlier into an outlier group based on its outlier type; and generating, by the processor, explainability for each detected outlier based on its outlier group.

A second aspect of the present invention provides a computing system, comprising: a processor; a memory device coupled to the processor; and a computer readable storage device coupled to the processor, wherein the storage device contains program code executable by the processor via the memory device to implement a method for identifying outliers in a heterogeneous system, the method comprising: receiving, by a processor of a computing system, a number of data points as input having a plurality of data types; formatting, by the processor, the received data points into a predefined format; detecting, by the processor, a number of outliers regardless of outlier type within the formatted data; collectively grouping, by the processor, each outlier into an outlier group based on its outlier type; and generating, by the processor, explainability for each detected outlier based on its outlier group.

A third aspect of the present invention provides a computer program product, comprising a computer readable hardware storage device storing a computer readable program code, the computer readable program code comprising an algorithm that when executed by a computer processor of a computing system implements a method for identifying outliers in a heterogeneous system, the method comprising: receiving, by a processor of a computing system, a number of data points as input having a plurality of data types; formatting, by the processor, the received data points into a predefined format; detecting, by the processor, a number of outliers regardless of outlier type within the formatted data; collectively grouping, by the processor, each outlier into an outlier group based on its outlier type; and generating, by the processor, explainability for each detected outlier based on its outlier group.

DETAILED DESCRIPTION

Sensor glitches, data entry errors, and malicious activities are a few examples of events that can lead to the appearance of outliers in a dataset. If undetected, these values can skew statistics, support invalid conclusions, slow database operations, and cause otherwise avoidable expenses. On the other hand, careful analysis of these values can yield new insight about the data, prevent undesirable events, and generally improve the reliability of the data. An "outlier" can be generally defined an observation which deviates so much from the other observations as to arouse suspicions that it was generated by a different mechanism. Any number of methods have been suggested to detect and, in some cases, eliminate suspicious values. Previous approaches to outlier detection include modeling numerical data using Gaussian Mixture Models, Histogram modeling, and k-nearest neighbors, to name a few.

Having the ability to identify abnormal (or outlier) data points in a system is vital for an organization to improve product quality, service, etc. The diversity in data available at present leads to heterogenous data which can be both structured and unstructured. Existing systems tend towards only specific data and domain. The approaches of many existing solutions regarding outlier detection are narrowly focused on either time series data or a text corpus. These are applicable only on homogenous systems, which can tackle only one problem at a time (e.g., detect either global or collective or contextual anomalies). There exists a lack of a single architecture to handle heterogenous data, identify outliers and provide outlier explainability. Today, the interpretation of detected outliers is often left to users. As a result, it is difficult for users to promptly take appropriate actions concerning the detected outliers. To lessen this difficulty, when outliers are identified, they should be presented together with their explainability (i.e., reason/explanation why each outlier was classified as such).

Figure 1:
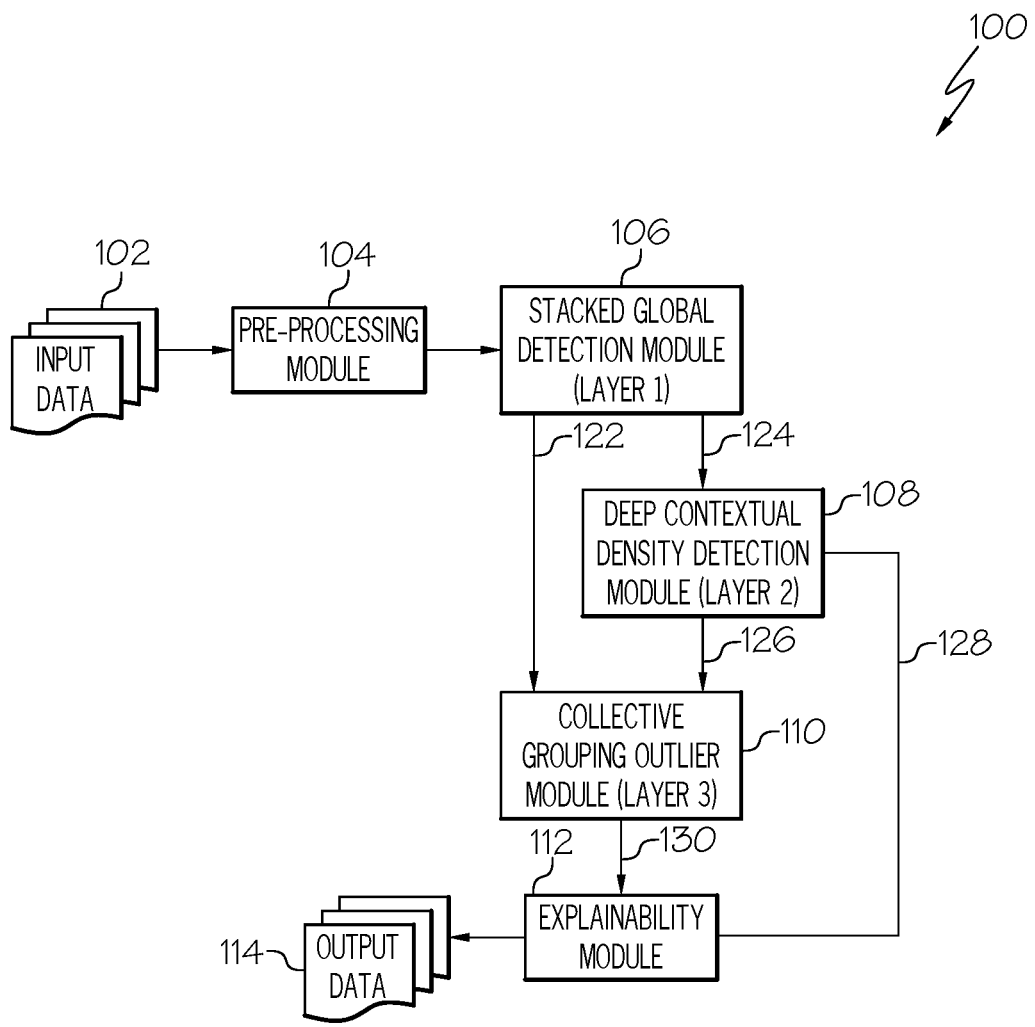
FIG. 1 is a diagram illustrating a system architecture in accordance with embodiments of the present invention.

Referring to the drawings, FIG. 1 depicts a block diagram of an explainable outlier identification system 100 (hereinafter referred to as "layered identification system 100"), in accordance with embodiments of the present invention. The system architecture includes input data 102, a pre-processing module 104, a stacked global detection module 106, a deep contextual density detection module 108, a collective grouping outlier module 110, explainability module 112, and output data 114.

Input data 102 can include any type of data (e.g., heterogeneous data, time series data, text data, etc.) apart from multimedia data. Heterogeneous data includes any data with high variability of data types and formats. Data elements in public or proprietary databases can be stored in heterogeneous data formats ranging from simple files to fully structured database systems that are often ad hoc, application-specific, vendor-specific, and/or the like. For example, scientific literature, images, and other free-text documents are commonly stored in unstructured or semi-structured formats (plain text files, HTML or XML files, binary files). Time series data, also referred to as time-stamped data, is a sequence of data points indexed in time order. Time-stamped is data collected at different points in time that is marked with the time at which the data was collected. These data points typically consist of successive measurements made from the same source over a time interval and are used to track change over time. Text data sources can include, but is not limited to, library databases, social media, open sources, web scraping, language corpora, transcription of audio/ video data, etc.

Pre-processing module 104 is configured to identify a type of input that has been passed to system and convert the data into a predefined algorithmic format. When dealing with multiple heterogeneous data sources, an initial aim is to reformat the different manifestations of the data to get a unified view that gives the disclosed system the ability of to interact with the data as if it were from one single data source.

Again, given heterogeneous types of data, the layered identification system 100 identifies the types of input that have been passed to the system and converts the data into a predefined format that is able to be processed by layered identification system 100. Identifying abnormal data points in any system is vital for an organization to improve product quality, service, etc. Many different types of such abnormal data points can persist in data, such as global, context, and/or collective outliers. Current algorithms find either of these outlier types but not all in a homogeneous data environment.

Identifying all types of potential outliers from the heterogeneous system (excluding multimedia) can be essential in data analysis. For example, identifying spending anomalies in a cloud infrastructure can help a consumer by notifying her to be more careful in spending outside a predefined budget amount. Success in business can depend on making the right decisions at the right time. Quickly detecting and analyzing outliers can enable the business to make more sound decisions to generate more revenue or avoid losses. To that end, the business must know what types of outliers it must detect so that it can have more confidence in its data.

Stacked global detection module 106 is configured to receive the formatted data and identify any global outliers (also called "point anomalies") by making a first pass (layer 1) over the data. A data point is considered a global outlier if its value is far outside the entirety of the data set in which it is found. For example, if 99 out of 100 points have values between 300 and 400, but the 100th point has a value of 750, the 100th point may be identified as a global outlier.

In a business example, consider a banking customer who normally deposits no more than $1000 a month in checks at a local ATM suddenly makes two cash deposits of $3000 each in the span of two weeks. This is identified as a global anomaly because this event has not occurred in this customer's history. The time series data of his weekly deposits would show an abrupt recent spike. Such a drastic change can be considered global outliers based on the customer's banking history.

In an embodiment, a data point can be identified as an outlier by using Histogram-Based Outlier Scoring (HBOS) plus Robust Principal Component Analysis (rPCA) with Mahalanobis distance metrics to provide a global anomaly score by adding together the output of these two metrics. Based on a predefined threshold, data points (or instances) are classified as normal or anomalous with respect to their global anomaly score. The threshold value determines how sensitive the system reacts to anomalous conditions and represents a hyperparameter. For example, a detection threshold might be set to 1.5 times the maximum (and minimum) deviation measured. In other embodiments, other techniques, now known or later developed, can be used to categorize a data point as a global outlier.

Stacked global detection module 106 outputs two types of data. First, it outputs identified global outliers 122 which are passed as input to collective grouping outlier module (layer 3) 110. Second, it outputs a second set of data points (i.e., non-outliers 124) which are passed as input to deep contextual density detection module (layer 2) 108. Non-outliers 124 are then examined to determine if any contextual outliers exist within this set of data.

Deep contextual density detection module 108 is configured to receive the formatted data and identify any contextual outliers by making a second pass (layer 2) over the data. A data point is considered a contextual outlier if its value significantly deviates from the rest the data points in the same context. Note that this means that same value may not be considered an outlier if it occurred in a different context. For example, with time series data, the "context" is almost always temporal because time series data are records of a specific quantity over time. To that end, contextual outliers can be common in time series data. A sudden surge in order volume at an e-commerce company, as seen in that company's hourly total orders for example, could be a contextual outlier if this high volume occurs outside of a known promotional discount or high-volume period like "Black Friday". The surge might indicate a pricing glitch which is allowing customers to pay pennies on the dollar for a product, something the company would want to quickly remedy.

Deep contextual density detection module 108 receives non-outliers from stacked global detection module 106 and identifies any potential contextual outliers from the received data. In an embodiment, deep contextual density detection module 108 uses cluster-based local outlier factor (CBLOF) algorithm plus a deep variational auto encoder with cosine similarity distance metric to identify any potential context outliers from given data. In other embodiments, other techniques, now known or later developed, can be used to categorize a data point as a contextual outlier.

Deep contextual density detection module 108 outputs two types of data. First, it outputs identified contextual outliers 126 which are passed as input to collective grouping outlier module (layer 3) 110. Second, it outputs a second set of data points (i.e., non-outliers 128) which are passed as input data to explainability module 112. Non-outliers 128 indicate data points not identified as global or contextual outliers.

Collective grouping outlier module 110 is configured to receive global outliers from stacked global detection module (Layer 1) 106 and contextual outliers from deep contextual density detection module (Layer 2) 108. In an embodiment, collective grouping outlier system 110 then performs a density-based spatial clustering (DBScan) algorithm to identify any groups that can be formed from the received outlier data. It is also configured to provide explainability why those points were grouped together.

Explainability component 112 is configured to receive non-outliers 128 and outliers 130 (along with each outlier's assigned grouping) to generate explainability why each outlier data point 130 has been classified as an anomaly and assigned a particular group classification when compared with the other data points. As stated, explainability is the concept that a machine learning model and its output can be explained in a way that "makes sense" to a human being at an acceptable level. It aims to answer user questions about the decision-making process of outlier identification. In other words, it provides an explanation or reason as to why a particular data point was classified as an outlier and why it was grouped into a particular group classification. Results (e.g., non-outlier data points, outlier data points, explainability, etc.) can be presented as output data 114 to a user.

Figure 2A:
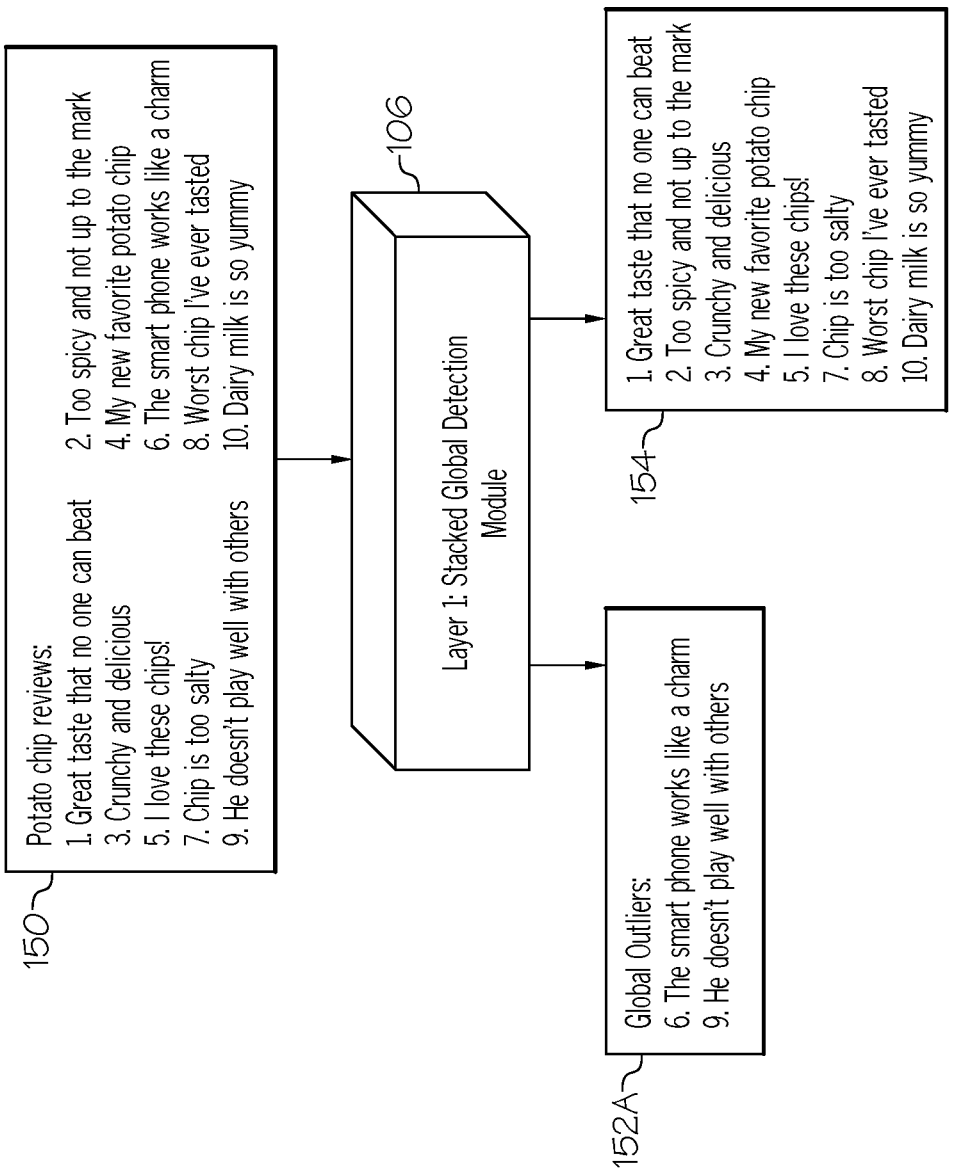
FIGS. 2A-C depict block diagrams for identifying and collectively grouping outliers in a heterogeneous system, in accordance with embodiments of the present invention.
Figure 2B:
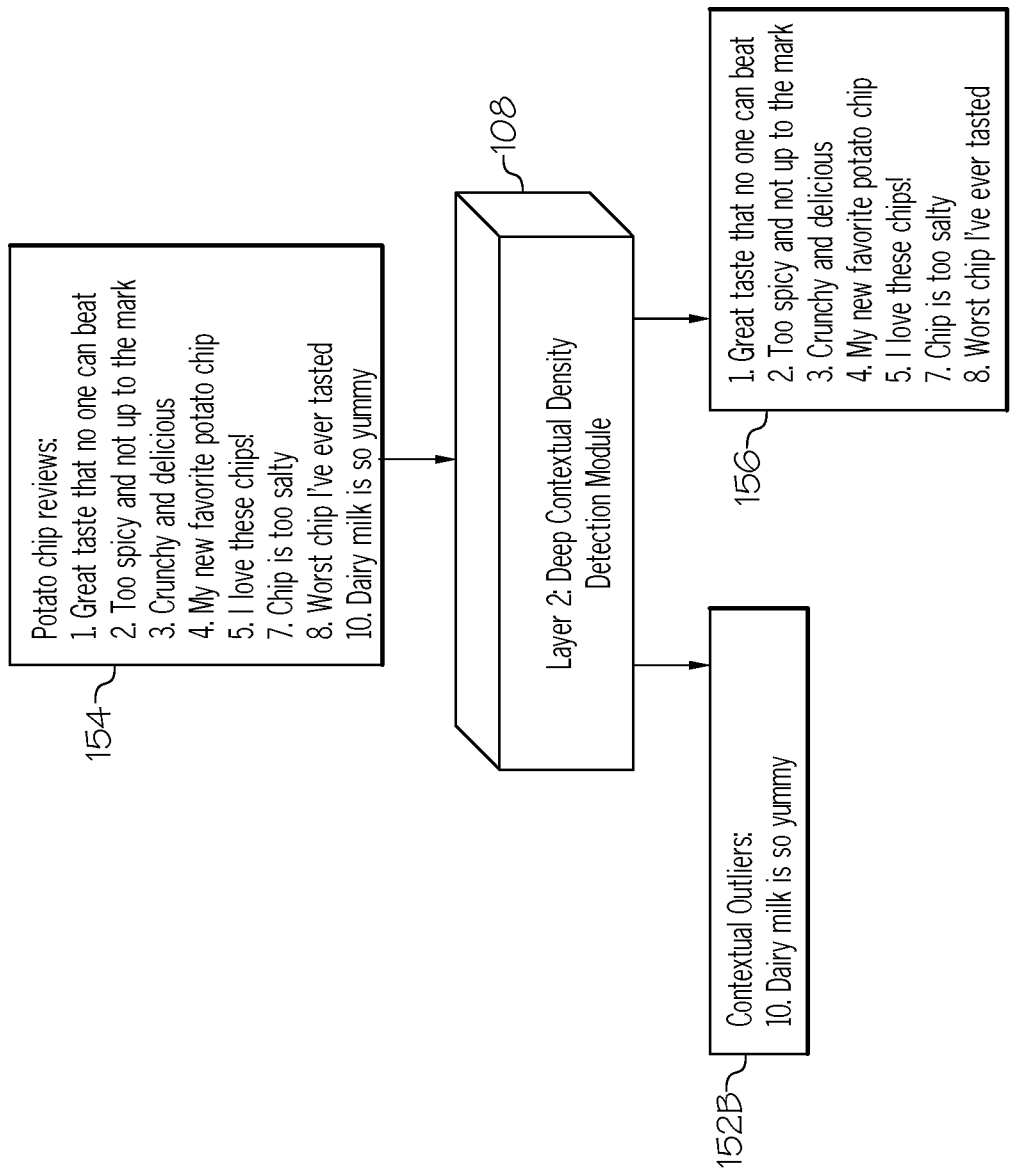
Figure 2C:
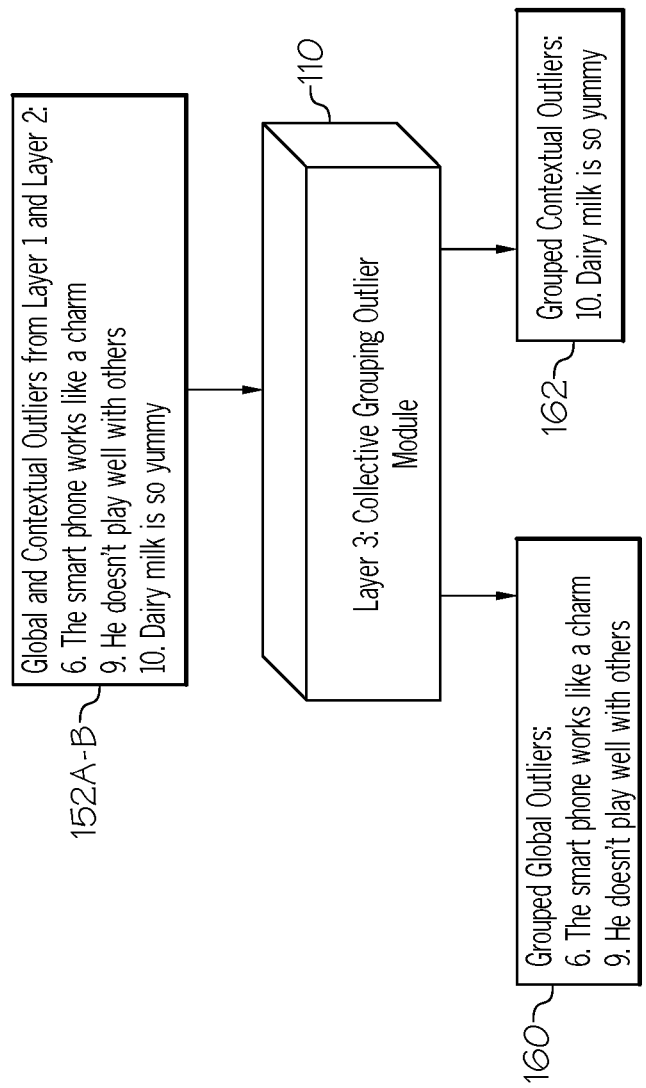

FIGS. 2A-C depict block diagrams for identifying and collectively grouping outliers in a heterogeneous system, in accordance with embodiments of the present invention. Consider an example in which a company launches a new potato chip brand and receives reviews 150 of the new product. As shown in FIG. 2A, stacked global detection module 106 receives the potato chip reviews as input. It identifies the global outliers 152A among the ten reviews (i.e., reviews #6 and #9 are identified as global outliers). Global outliers 152A are passed as input to collective grouping outlier module 110. The remaining reviews 154 are considered non-outliers at this point. They are passed as input to deep contextual density detection module 108.

As shown in FIG. 2B, contextual density detection module 108 receives the non-outlier data points 154 from stacked global detection module 106. Contextual density detection module 108 identifies any contextual outliers among the received data (i.e., review #10 is identified as a contextual outlier 152B). The remaining reviews 156 are considered non-outliers. Contextual outliers 152B are passed as input to collective grouping outlier module 110.

As shown in FIG. 2C, outliers (both global outliers 152A and contextual outliers 1526) are received as input to collective grouping outlier module (layer 3) 110. The outliers are collectively grouped based on outlier type. In other words, reviews #6 and #9 are grouped global outliers 160, while review #10 is grouped contextual outliers 162. Explainability can be generated based on the collective grouping.

Current systems are limited to one type of data (i.e., time series data, text corpus, etc.). Also, today's solutions can detect either global or collective or contextual anomaly types, but not all types. Layered identification system 100 provides a single architecture configured to handle as input heterogenous data types and identify all potential outliers. In other words, the described approach is robust to any type of data and can identify each of the above-described outlier types.

In an embodiment, machine learning can be used for real-time (or near real-time) detection of data outliers or anomalies. Machine learning is a field of inquiry devoted to understanding and building methods that 'learn', that is, methods that leverage data to improve performance on some set of tasks. Machine learning involves a training step. Training is the most important step in machine learning. In training, prepared data is passed to the machine learning algorithm (or model) to find patterns and make predictions. It results in the model learning from the data so that it can accomplish the task set. Over time, with training, the algorithm gets better at predicting as it receives additional data in the future.

Machine learning is seen as a part of artificial intelligence. Finding and identifying outliers can help to prevent fraud, adversary attacks, or network intrusions that can compromise a company's future. As stated, generally speaking, an outlier or anomaly is something that differs from a norm: a deviation, an exception, and/or the like. In software engineering, an outlier is an occurrence or event that doesn't fit into the pattern, and, therefore, seems suspicious.

A company today might require outlier detection work with huge amounts of data: transactions, text, image, and video content, etc. A person would have to spend days going through all the transitions that happen inside a bank every hour, for example, and more and more are generated every second. It is simply impossible to drive any meaningful insights from this amount of data manually. Moreover, another difficulty is that the data is often unstructured, which means that the information wasn't arranged in any specific way for the data analysis. For example, business documents, emails, or images are examples of unstructured data.

To be able to collect, clean, structure, analyze, and store data, a company might need to use tools that can handle large volumes of data. Machine learning techniques, in fact, show the best results when large data sets are involved. Machine learning algorithms are able to process most types of data. Moreover, an algorithm can be chosen based on a particular problem and even combine different techniques for the best results. Machine learning used for real-world applications helps to streamline the process of anomaly detection and save resources. It can happen not only post-factum but also in real time (or near real-time). Real-time anomaly detection is applied to improve security and robustness, for instance, in fraud discovery and cybersecurity.

Three different kinds of outlier detection methods exist that rely on machine learning: supervised, unsupervised, and semi-supervised. In supervised anomaly detection, a machine learning engineer needs a training dataset. Items in the dataset are labeled into two categories: normal and abnormal. The model will use these examples to extract patterns and be able to detect abnormal patterns in the previously unseen data. In supervised learning, the quality of the training dataset is very important. There is a lot of manual work involved since a person needs to collect and label examples.

Unsupervised is the most common type of outlier detection, and the most well-known representative of unsupervised algorithms are neural networks. Artificial neural networks can decrease the amount of manual work needed to pre-process examples (i.e., no manual labeling is needed). Neural networks can even be applied to unstructured data. Neural networks can detect anomalies in unlabeled data and use what they have learned when working with new data. The advantage of this method is that it allows one to decrease the manual work in anomaly detection. Moreover, quite often it's impossible to predict all the anomalies that can occur in the dataset. Consider the example of self-driving cars. They can face a situation on the road that has never happened before. Putting all road situations into a finite number of classes would be impossible. That is why neural networks are priceless when working with real-life data in real-time.

Semi-supervised anomaly detection methods combine the benefits of the previous two methods. A machine learning engineer can apply unsupervised learning methods to automate feature learning and work with unstructured data. However, by combining it with human supervision, the engineer has an opportunity to monitor and control what kind of patterns the model learns. This typically helps to make the model's predictions more accurate.

Referring back to FIG. 1, layered identification system 100 provides output data 114 which can include the non-outlier data points, the outlier data points, and explainability for each outlier data point. For a company to benefit more from the results of the outlier detection process, the results should be explainable. To this end, layered identification system 100 should include two tasks: outlier detection and outlier explainability. Explainability will enhance the users' understanding of outliers and can be used to improve the outlier detection task further. As a result, explainability can assist outlier mitigation, which is a process for deciding what to do with the identified outliers and how to utilize them to improve predictive models, such as future web traffic for the network location, finance and asset pricing, and waterborne applications, and/or the like.

Supervised models typically have a training step that outputs a model, and the trained model is then explained. In unsupervised outlier detection, often there is no explicit training step, but sometimes the algorithm calculates statistical parameters, finds best subspaces, or performs other computations to rank objects on outlierness.

When a supervised model has been trained, it can typically make predictions on a single object or data point without the need for the rest of the dataset. Unsupervised outlier algorithms without a training step, on the other hand, use the dataset when predicting. The divide between training and predicting is more fluent. In the end, both supervised classifiers and outlier algorithms, with or without a training step, provide an algorithm/model that makes predictions and depends on the training data, either directly or indirectly. Regardless, outlier explainability can include a message displayed on a screen of a device explaining the causal relationship within the model and why the model ranks or categorizes the objects as it does.

Figure 3:
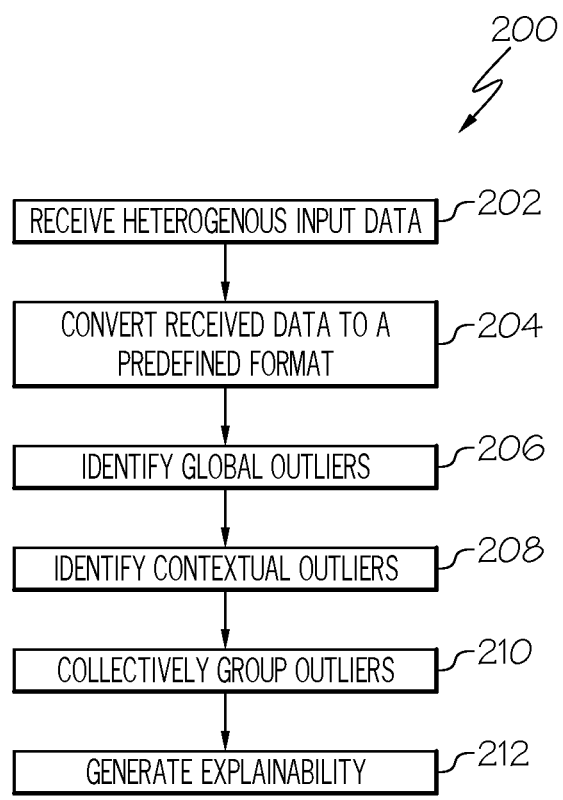
FIG. 3 depicts a flow chart of a method for identifying outliers in a heterogeneous system and generating outlier explainability, in accordance with embodiments of the present invention.

Referring now to FIG. 3, which depicts a flow chart of a method 200 for identifying outliers in a heterogeneous system, in accordance with embodiments of the present invention. One embodiment of a method 200 or algorithm that may be implemented for identifying outliers in a heterogeneous system with the layered identification system 100 described in FIG. 1 using at least one computer system as defined generically in FIG. 4 below, and more specifically by the specific embodiments of FIG. 1.

Embodiments of the method 200 for identifying outliers in a heterogeneous system, in accordance with embodiments of the present invention, may begin at step 202 wherein heterogeneous input data is received from any number of data sources. Step 204 converts the received data into a predefined format. Step 206 detects global outliers (also known as point anomalies). Step 208 detects contextual outliers (also known as conditional anomalies). Step 210 collectively groups each identified outlier based on its outlier type (e.g., global or contextual). The detection steps can identify all types of potential outliers in the data. Based on the non-outlier data points and detected outliers from the heterogenous data received, output data is generated including explainability for each detected outlier. In an embodiment, Explainable Artificial Intelligence (XAI) techniques can be used to generate explainability for outlier classifications. Step 212 generates why layered identification system 100 classified different types of outliers when compared with non-outliers. The results of layered identification system 110 can be presented (e.g., displayed as text, e-mail, etc.) to a user.

Figure 4:
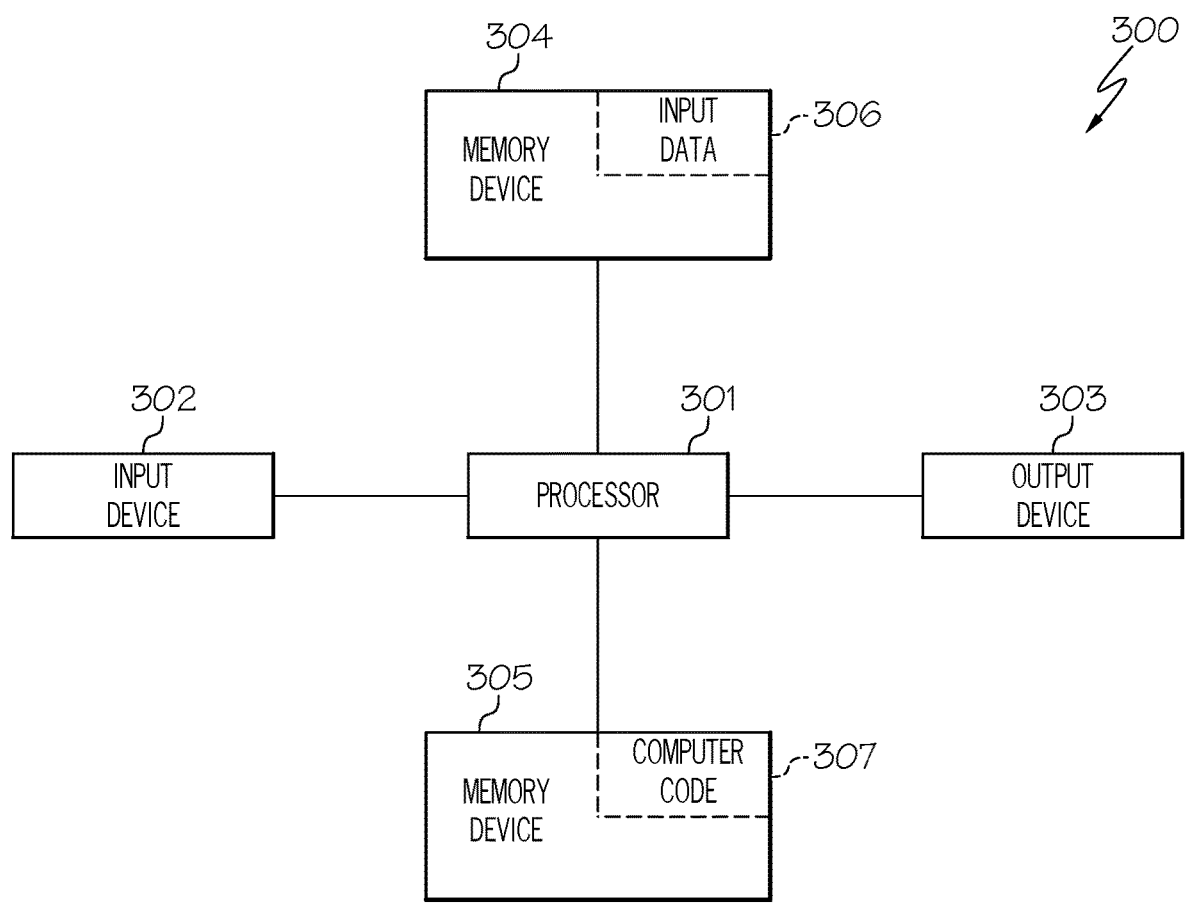
FIG. 4 depicts a block diagram of a computer system for the identification system of FIG. 1, capable of implementing for identifying outliers in a heterogeneous system and generating outlier explainability, in accordance with embodiments of the present invention.

FIG. 4 depicts a block diagram of a computer system for the layered identification system 100 of FIG. 1, capable of implementing methods for identifying outliers in a heterogeneous system, in accordance with embodiments of the present invention. The computer system 300 may generally comprise a processor 301, an input device 302 coupled to the processor 301, an output device 303 coupled to the processor 301, and memory devices 304 and 305 each coupled to the processor 301. The input device 302, output device 303 and memory devices 304, 305 may each be coupled to the processor 301 via a bus. Processor 301 may perform computations and control the functions of computer system 300, including executing instructions included in the computer code 307 for the tools and programs capable of implementing a method for identifying outliers in a heterogeneous system using the layered identification system 100 of FIG. 1, wherein the instructions of the computer code 307 may be executed by processor 301 via memory device 305. The computer code 307 may include software or program instructions that may implement one or more algorithms for implementing the method for identifying outliers in a heterogeneous system, as described in detail above. The processor 301 executes the computer code 307. Processor 301 may include a single processing unit or may be distributed across one or more processing units in one or more locations (e.g., on a client and server).

The memory device 304 may include input data 306. The input data 306 includes any inputs required by the computer code 307. The output device 303 displays output from the computer code 307. Either or both memory devices 304 and 305 may be used as a computer usable storage medium (or program storage device) having a computer-readable program embodied therein and/or having other data stored therein, wherein the computer-readable program comprises the computer code 307. Generally, a computer program product (or, alternatively, an article of manufacture) of the computer system 300 may comprise said computer usable storage medium (or said program storage device).

Memory devices 304, 305 include any known computer-readable storage medium, including those described in detail below. In one embodiment, cache memory elements of memory devices 304, 305 may provide temporary storage of at least some program code (e.g., computer code 307) in order to reduce the number of times code must be retrieved from bulk storage while instructions of the computer code 307 are executed. Moreover, similar to processor 301, memory devices 304, 305 may reside at a single physical location, including one or more types of data storage, or be distributed across a plurality of physical systems in various forms. Further, memory devices 304, 305 can include data distributed across, for example, a local area network (LAN) or a wide area network (WAN). Further, memory devices 304, 305 may include an operating system (not shown) and may include other systems not shown in FIG. 4.

In some embodiments, the computer system 300 may further be coupled to an Input/output (I/O) interface and a computer data storage unit. An I/O interface may include any system for exchanging information to or from an input device 302 or output device 303. The input device 302 may be, inter alia, a keyboard, a mouse, etc. or in some embodiments the touchscreen of a computing device. The output device 303 may be, inter alia, a printer, a plotter, a display device (such as a computer screen), a magnetic tape, a removable hard disk, a floppy disk, etc. The memory devices 304 and 305 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 300, and may include any type of transmission link, including electrical, optical, wireless, etc.

An I/O interface may allow computer system 300 to store information (e.g., data or program instructions such as program code 307) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to outlier detection systems and methods. Thus, an embodiment of the present invention discloses a process for supporting computer infrastructure, where the process includes providing at least one support service for at least one of integrating, hosting, maintaining and deploying computer-readable code (e.g., program code 307) in a computer system (e.g., computer system 300) including one or more processor(s) 301, wherein the processor(s) carry out instructions contained in the computer code 307 causing the computer system to identify outliers in a heterogeneous system. Another embodiment discloses a process for supporting computer infrastructure, where the process includes integrating computer-readable program code into a computer system 300 including a processor.

The step of integrating includes storing the program code in a computer-readable storage device of the computer system 300 through use of the processor. The program code, upon being executed by the processor, implements a method for identifying outliers in a heterogeneous system. Thus, the present invention discloses a process for supporting, deploying and/or integrating computer infrastructure, integrating, hosting, maintaining, and deploying computer-readable code into the computer system 300, wherein the code in combination with the computer system 300 is capable of performing a method for identifying outliers in a heterogeneous system.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
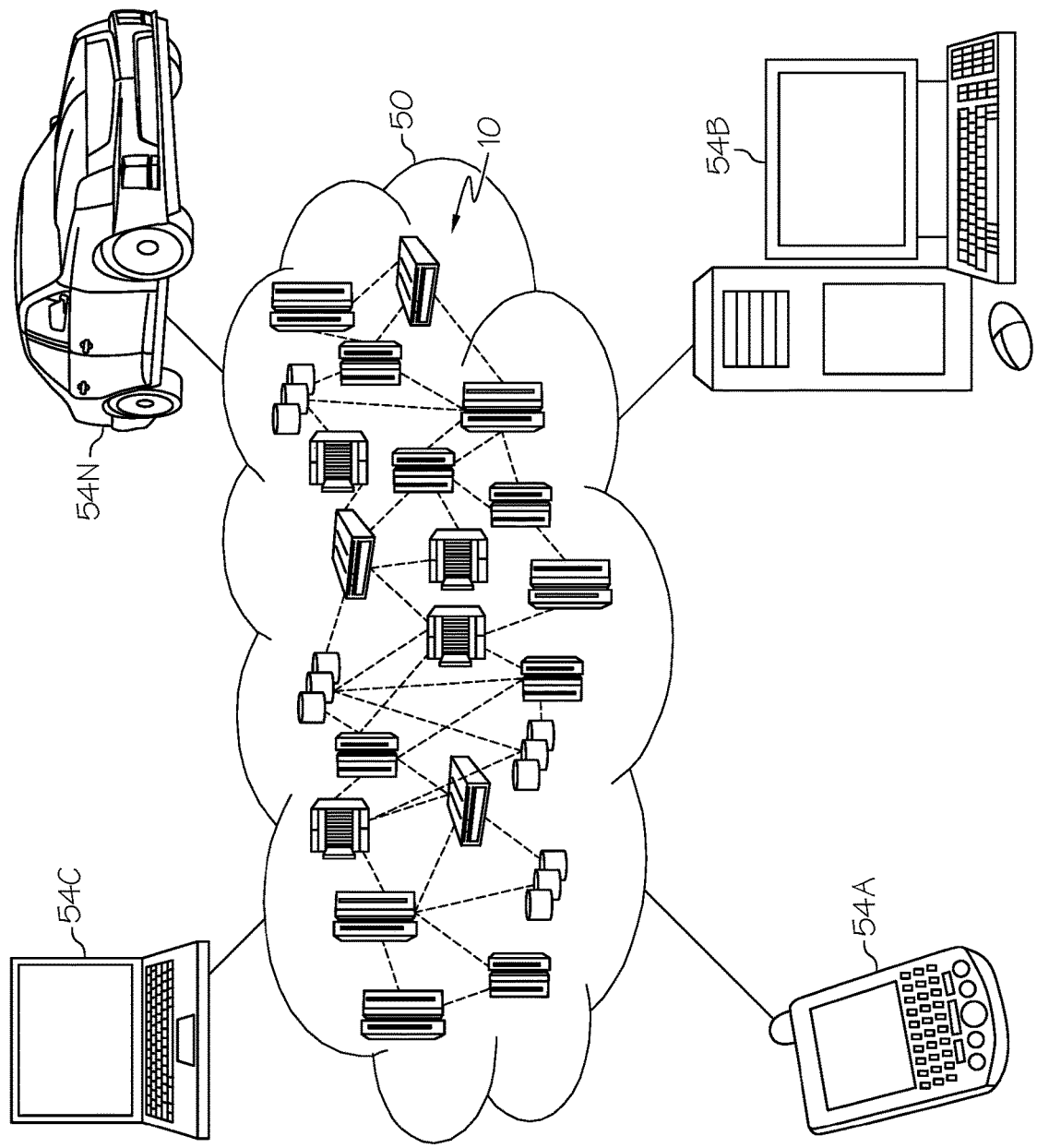
FIG. 5 depicts a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
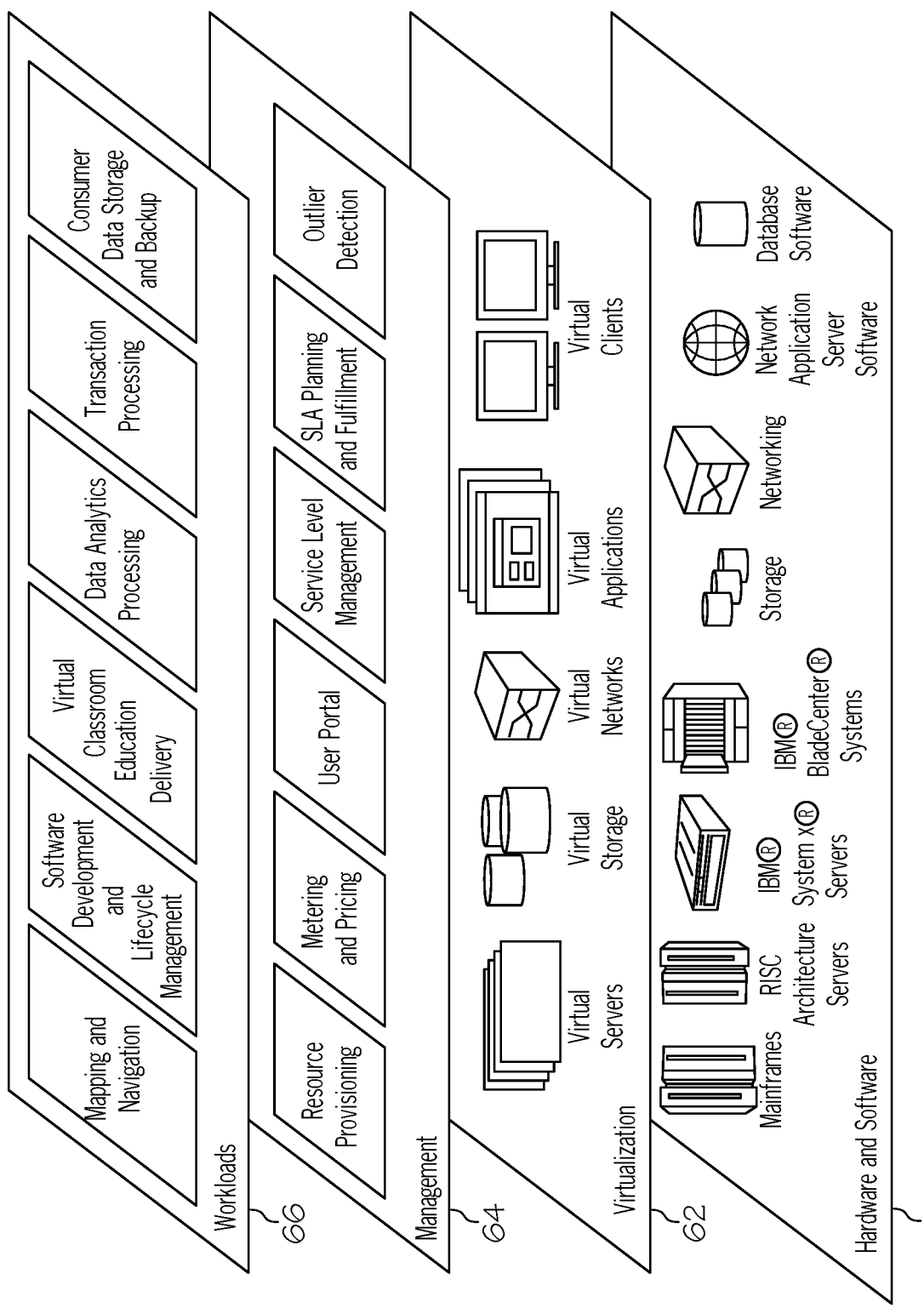
FIG. 6 depicts abstraction model layers, in accordance with embodiments of the present invention.

Referring now to FIG. 6, a set of functional abstraction layers provided by cloud computing environment 50 (see FIG. 5) are shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and GUI and outlier identifiers 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for identifying outliers in a heterogeneous system, the method comprising:
   receiving, by a processor of a computing system, a number of data points as input having a plurality of data types;

formatting, by the processor, the received data points into a predefined format;

detecting as a first part of a two-step detection process, by a global detection module of the processor, a number of global outliers regardless of outlier type within the formatted data;

passing, by the global detection module, the global outliers to a collective grouping outlier module of the processor and non-global outliers within the formatted data to a deep contextual density detection module of the processor;

detecting as a second part of the two-step detection process following the detecting as the first part of the two-step detection process and the passing, by the deep contextual density detection module, a number of contextual outliers within the non-global outliers of the formatted data, the non-global outliers being a subset of the formatted data that does not include the global outliers;

passing, by the deep contextual density detection module, the contextual outliers and non-global and non-contextual outliers to the collective grouping outlier module;

collectively grouping, by the collective grouping outlier module, each global outlier into a global outlier group and each contextual outlier into a contextual outlier group; and generating, by the processor, explainability for each global outlier based on its global outlier group and explainability for each contextual outlier based on its contextual outlier group.

2. The method of claim 1, wherein:

the detecting of the number of the global outliers comprises performing a machine learning algorithm to detect the global outliers using a sum of Histogram-Based Outlier Scoring (HBOS) and a Robust Principal Component Analysis (rPCA) with Mahalanobis distance metrics, and the detecting of the number of the contextual outliers comprises performing a machine learning algorithm to detect the global outliers using a sum of a cluster-based local outlier factor (CBLOF) algorithm plus a deep variational auto encoder with a cosine similarity distance metric.

3. The method of claim 1, wherein:

the collectively grouping of each global outlier into the global outlier group and each contextual outlier into the contextual outlier group comprises performing a density-based spatial clustering (DBScan) algorithm, the generating of the explainability for each global outlier is based on the global outlier being grouped into the global outlier group, and the generating of the explainability for each contextual outlier is based on the contextual outlier being grouped into the contextual outlier group.

4. The method of claim 1, further comprising outputting, by the processor, the non-global outlier and non-contextual outlier data points.

5. The method of claim 1, further comprising displaying, by the processor, the outlier explainability as a message on a screen of a device, wherein the message includes a reason why the outlier was classified as a global outlier or as a contextual outlier.

6. The method of claim 5, wherein the message is generated using Explainable Artificial Intelligence (XAI) techniques.

7. The method of claim 1, wherein the plurality of data types is selected from a group consisting of social media content, open-source data, web scraping data, a language corpora, and a transcription of audio/video data.

8. A computing system, comprising:

a processor;

a memory device coupled to the processor; and a computer readable storage device coupled to the processor, wherein the storage device contains program code executable by the processor via the memory device to implement a method for identifying outliers in a heterogeneous system, the method comprising:

receiving, by a processor of a computing system, a number of data points as input having a plurality of data types;

formatting, by the processor, the received data points into a predefined format;

detecting as a first part of a two-step detection process, by a global detection module of the processor, a number of global outliers regardless of outlier type within the formatted data;

passing, by the global detection module, the global outliers to a collective grouping outlier module of the processor and non-global outliers within the formatted data to a deep contextual density detection module of the processor;

detecting as a second part of the two-step detection process following the detecting as the first part of the two-step detection process and the passing, by the deep contextual density detection module, a number of contextual outliers within the non-global outliers of the formatted data, the non-global outliers being a subset of the formatted data that does not include the global outliers;

passing, by the deep contextual density detection module, the contextual outliers and non-global and non-contextual outliers to the collective grouping outlier module;

collectively grouping, by the collective grouping outlier module, each global outlier into a global outlier group and each contextual outlier into a contextual outlier group; and generating, by the processor, explainability for each global outlier based on its global outlier group and explainability for each contextual outlier based on its contextual outlier group.

9. The computing system of claim 8, wherein:

the detecting of the number of the global outliers comprises performing a machine learning algorithm to detect the global outliers using a sum of Histogram-Based Outlier Scoring (HBOS) and a Robust Principal Component Analysis (rPCA) with Mahalanobis distance metrics, and the detecting of the number of the contextual outliers comprises performing a machine learning algorithm to detect the global outliers using a sum of a cluster-based local outlier factor (CBLOF) algorithm plus a deep variational auto encoder with a cosine similarity distance metric.

10. The computing system of claim 8, wherein:

the collectively grouping of each global outlier into the global outlier group and each contextual outlier into the contextual outlier group comprises performing a density-based spatial clustering (DBScan) algorithm, the generating of the explainability for each global outlier is based on the global outlier being grouped into the global outlier group, and the generating of the explainability for each contextual outlier is based on the contextual outlier being grouped into the contextual outlier group.

11. The computing system of claim 8, further comprising outputting, by the processor, the non-global outlier and non-contextual outlier data points.

12. The computing system of claim 8, further comprising displaying, by the processor, the outlier explainability as a message on a screen of a device, wherein the message includes a reason why the outlier was classified as a global outlier or as a contextual outlier.

13. The computing system of claim 12, wherein the message is generated using Explainable Artificial Intelligence (XAI) techniques.

14. The computing system of claim 8, wherein the plurality of data types is selected from a group consisting of social media content, open-source data, web scraping data, a language corpora, and a transcription of audio/video data.

15. A computer program product, comprising a computer readable hardware storage device storing a computer readable program code, the computer readable program code comprising an algorithm that when executed by a computer processor of a computing system implements a method for identifying outliers in a heterogeneous system, the method comprising:
receiving, by a processor of a computing system, a number of data points as input having a plurality of data types;
formatting, by the processor, the received data points into a predefined format;
detecting as a first part of a two-step detection process, by a global detection module of the processor, a number of global outliers regardless of outlier type within the formatted data;
passing, by the global detection module, the global outliers to a collective grouping outlier module of the processor and non-global outliers within the formatted data to a deep contextual density detection module of the processor;
detecting as a second part of the two-step detection process following the detecting as the first part of the two-step detection process and the passing, by the deep contextual density detection module, a number of contextual outliers within the non-global outliers of the formatted data the non-global outliers being a subset of the formatted data that does not include the global outliers;
passing, by the deep contextual density detection module, the contextual outliers and non-global and non-contextual outliers to the collective grouping outlier module;
collectively grouping, by the collective grouping outlier module, each global outlier into a global outlier group and each contextual outlier into a contextual outlier group; and
generating, by the processor, explainability for each global outlier based on its global outlier group and explainability for each contextual outlier based on its contextual outlier group.

16. The computer program product of claim 15, wherein:
the detecting of the number of the global outliers comprises performing a machine learning algorithm to detect the global outliers using a sum of Histogram-Based Outlier Scoring (HBOS) and a Robust Principal Component Analysis (rPCA) with Mahalanobis distance metrics, and
the detecting of the number of the contextual outliers comprises performing a machine learning algorithm to detect the global outliers using a sum of a cluster-based local outlier factor (CBLOF) algorithm plus a deep variational auto encoder with a cosine similarity distance metric.

17. The computer program product of claim 15, wherein:
the collectively grouping of each global outlier into the global outlier group and each contextual outlier into the contextual outlier group comprises performing a density-based spatial clustering (DBScan) algorithm,
the generating of the explainability for each global outlier is based on the global outlier being grouped into the global outlier group, and
the generating of the explainability for each contextual outlier is based on the contextual outlier being grouped into the contextual outlier group.

18. The computer program product of claim 15, further comprising outputting, by the processor, the non-global outlier and non-contextual outlier data points.

19. The computer program product of claim 15, further comprising displaying, by the processor, the outlier explainability as a message on a screen of a device, wherein the message includes a reason why the outlier was classified as a global outlier or as a contextual outlier.

20. The computer program product of claim 19, wherein the message is generated using Explainable Artificial Intelligence (XAI) techniques.

* * * * *